(12) United States Patent
King et al.

(10) Patent No.: US 10,884,482 B2
(45) Date of Patent: Jan. 5, 2021

(54) PRIORITIZING POWER DELIVERY TO PROCESSING UNITS USING HISTORICAL WORKLOAD INFORMATION

(71) Applicant: International Business Machines Corporation, Armonk, NY (US)

(72) Inventors: Justin K. King, Rochester, MN (US); Abby Harrison, Rochester, MN (US); Jakob Olandt, Rochester, MN (US); Brittany Duffy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 16/117,125

(22) Filed: Aug. 30, 2018

(65) Prior Publication Data
US 2020/0073467 A1  Mar. 5, 2020

(51) Int. Cl.
*G06F 1/3287* (2019.01)
*G06F 9/50* (2006.01)
*G06F 1/329* (2019.01)

(52) U.S. Cl.
CPC ............ *G06F 1/3287* (2013.01); *G06F 1/329* (2013.01); *G06F 9/5094* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,245,725 B1 * | 7/2007 | Beard | .................... | G06F 1/3203 380/270 |
| 7,698,579 B2 * | 4/2010 | Hendry | ................. | G06F 1/3218 345/502 |
| 7,721,118 B1 | 5/2010 | Tamasi et al. | | |
| 8,102,398 B2 * | 1/2012 | Bajic | ..................... | G06F 1/3225 345/503 |
| 8,233,000 B1 * | 7/2012 | Diard | .................... | G06F 1/3206 345/502 |
| 8,839,012 B2 | 9/2014 | Khodorkovsky | | |
| 9,256,265 B2 | 2/2016 | Huang et al. | | |
| 9,514,009 B2 | 12/2016 | Alshinnawi et al. | | |
| 2005/0125703 A1 * | 6/2005 | Lefurgy | ................ | G06F 1/3203 713/320 |
| 2005/0289365 A1 * | 12/2005 | Bhandarkar | .......... | G06F 1/3203 713/300 |
| 2008/0204460 A1 * | 8/2008 | Marinkovic | .......... | G06F 1/3203 345/502 |
| 2009/0109230 A1 * | 4/2009 | Miller | ................... | G06F 1/3203 345/506 |

(Continued)

Primary Examiner — Raymond N Phan
(74) Attorney, Agent, or Firm — Patterson + Sheridan, LLP

(57) ABSTRACT

A computer-implemented method (and associated computing system and computer program product) comprises distributing computing workloads among a plurality of processing units of a computing system. The method further comprises, responsive to detecting a reduced power supply capacity of the computing system: determining, based on historical workload information, a first workload of the computing workloads to prioritize the completion thereof, and prioritizing power delivery to a first processing unit of the plurality of processing units to which the first workload is distributed. The method further comprises powering down the first processing unit responsive to completion of the first workload.

20 Claims, 5 Drawing Sheets

(56) References Cited

U.S. PATENT DOCUMENTS

| | | | |
|---|---|---|---|
| 2013/0155081 A1* | 6/2013 | Khodorkovsky | G06F 1/3206 345/522 |
| 2014/0052965 A1* | 2/2014 | Sarel | G06F 9/4893 712/214 |
| 2016/0054782 A1 | 2/2016 | Kaburlasos et al. | |
| 2016/0180487 A1* | 6/2016 | Trawczynski | G06F 9/44 345/505 |
| 2017/0139454 A1 | 5/2017 | Venishetti et al. | |
| 2018/0039317 A1* | 2/2018 | Riguer | G06F 1/329 |

* cited by examiner

400

| FUNCTION | INSTANCE | START TIME | STOP TIME | RUNTIME | AVERAGE RUNTIME |
|---|---|---|---|---|---|
| f1 | 1 | 01:01.1 | 01:05.5 | 00:04.4 | |
| | 2 | 01:03.2 | 01:07.3 | 00:04.4 | 00:04.5 |
| | 3 | 03:15.7 | 03:20.8 | 00:05.1 | |
| f2 | 1 | 05:30.0 | 05:33.3 | 00:03.3 | 00:03.3 |
| f3 | 1 | 02:13.1 | 02:17.9 | 00:04.8 | 00:04.8 |
| ... | | ... | ... | ... | ... |
| fk | 1 | 01:02.8 | 01:08.2 | 00:05.4 | 00:06.1 |
| | 2 | 01:04.0 | 01:10.7 | 00:06.7 | |

405

| WORKLOAD | FUNCTION | GPU | START TIME | AVG. RUNTIME | EXPECTED COMPLETION | EXPECTED TIME REMAINING |
|---|---|---|---|---|---|---|
| WL1 | f1 | GPU1 | 07:13.7 | 00:04.5 | 07:18.2 | 00:03.2 |
| WL2 | f1 | GPU2 | 07:13.1 | 00:04.5 | 07:17.6 | 00:02.6 |
| WL3 | fk | GPU3 | 07:14.4 | 00:06.1 | 07:20.5 | 00:05.4 |
| WL4 | f3 | GPU4 | 07:12.1 | 00:04.8 | 07:16.9 | 00:01.9 |
| WL5 | f2 | GPU5 | 07:13.1 | 00:03.3 | 07:16.4 | 00:01.4 |

475 — CURRENT TIME 07:15.0
480 — PREDETERMINED COMPLETION WINDOW 00:01.5

FIG. 4

PRIORITIZING POWER DELIVERY TO PROCESSING UNITS USING HISTORICAL WORKLOAD INFORMATION

BACKGROUND

The present disclosure relates to power management for processing units in a computing system.

Many modern computing systems include a number of processing units, such as multiple central processing units (CPUs), multi-core processing units, combinations of one or more CPUs and one or more graphics processing units (GPUs), and so forth. In a reduced power situation, such as responsive to a degraded power supply, the operation of certain processing units (e.g., workloads being completed thereby) may be prioritized over other processing units. As the different processing units (or types) may draw different amounts of power, managing the power draw of the different processing units may be important to ensure continued operation of the prioritized processing units in the reduced power situation.

SUMMARY

According to one embodiment, a computer-implemented method comprises distributing computing workloads among a plurality of processing units of a computing system. The method further comprises, responsive to detecting a reduced power supply capacity of the computing system: determining, based on historical workload information, a first workload of the computing workloads to prioritize the completion thereof, and prioritizing power delivery to a first processing unit of the plurality of processing units to which the first workload is distributed. The method further comprises powering down the first processing unit responsive to completion of the first workload.

According to another embodiment, a computing system comprises a plurality of power supplies, and a plurality of processing units. A first set comprising a first processing unit of the plurality of processing units is configured to distribute computing workloads among a second set of the plurality of processing units. The first set is further configured to, responsive to detecting a reduced power supply capacity of the plurality of power supplies: determine, based on historical workload information, a first workload of the computing workloads to prioritize the completion thereof, and prioritize power delivery to a selected processing unit of the second set to which the first workload is distributed. The first set is further configured to power down the selected processing unit responsive to completion of the first workload.

According to another embodiment, a computer program product for distributing power among a plurality of graphics processing units (GPUs) of a computing system comprises a computer-readable storage medium having computer-readable program code embodied therewith. The computer-readable program code is executable by one or more computer processors to perform an operation comprising distributing computing workloads among the plurality of GPUs. The operation further comprises responsive to detecting a reduced power supply capacity of the computing system: determining, based on historical workload information, a first workload of the computing workloads to prioritize the completion thereof, and prioritizing power delivery to a first GPU of the plurality of GPUs to which the first workload is distributed. The operation further comprises powering down the first GPU responsive to completion of the first workload.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates exemplary historical workload information comprising average runtimes, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments discussed herein include a computing system comprising a plurality of power supplies and a plurality of processing units. A first set comprising a first processing unit of the plurality of processing units is configured to distribute computing workloads among a second set of the plurality of processing units. The first set is further configured to, responsive to detecting a reduced power supply capacity of the plurality of power supplies, determine, based on historical workload information, a first workload of the computing workloads to prioritize the completion thereof, and prioritize power delivery to a selected processing unit of the second set to which the first workload is distributed. The first set is further configured to power down the selected processing unit responsive to completion of the first workload.

Beneficially, by prioritizing power delivery to the selected processing unit, the first workload may be completed earlier than in other schemes where the selected processing unit has a reduced power delivery. By powering down the selected processing unit responsive to completion of the first workload, a relatively larger amount of power budget may be made available for operating the other processing units. This may improve the robustness of the computing system, as the remaining workloads may be completed more quickly while the issue causing the reduced power delivery is remedied (e.g., a failed power supply is replaced by a human operator). One or more of the other processor units may have their workloads prioritized in a similar manner.

In some embodiments, the first set comprises one or more CPUs of the computing system, and the second set comprises one or more GPUs of the computing system. In some embodiments, the first set determines the first workload for prioritized completion by determining that the first workload is expected to complete within a predetermined amount of time. For example, the first workload may comprise a first function and the first set determines the historical workload information by (1) storing a start time and a stop time for one or more instances of previously completing the first function, and (2) determining, based on the start time and the stop time, an average runtime of the first function. Determining that the first workload is expected to complete within a predetermined amount of time may be based on the average runtime.

In some embodiments, the first set determines the historical workload information by storing distribution information indicating a distribution of one or more previously completed workloads among the plurality of processing units. The first set determines the first workload by (1) identifying, based on the distribution information, which processing unit of the plurality of processing units is least likely to have a workload distributed to it after the reduced power supply capacity is detected, and (2) selecting the first workload from the identified processing unit.

Figure 1:
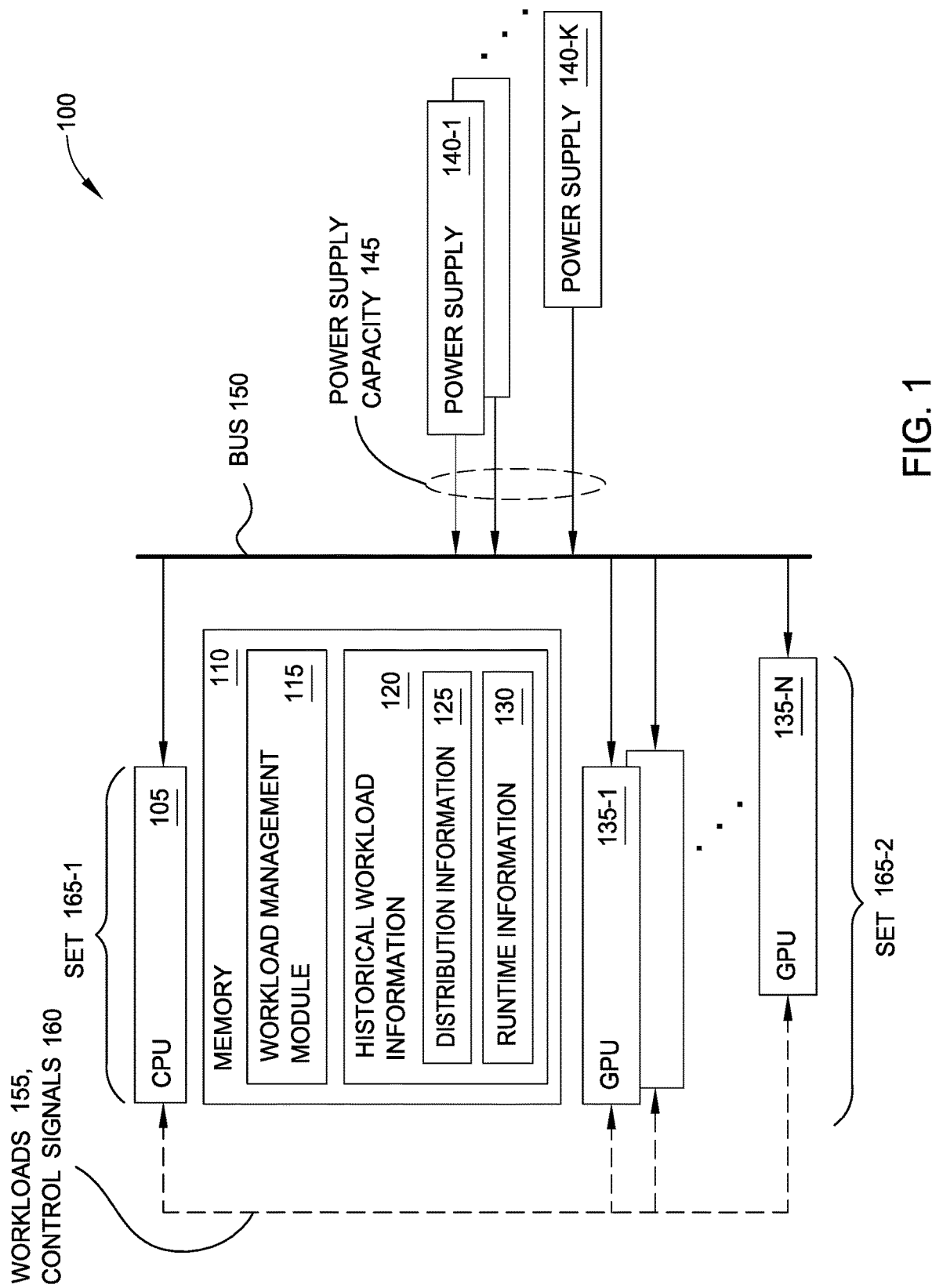
FIG. 1 is a block diagram of an exemplary computing system, according to one or more embodiments.

FIG. 1 is a block diagram of an exemplary computing system 100, according to one or more embodiments. The computing system 100 may be implemented in any suitable form. Some non-limiting examples of the computing system 100 include a standalone personal computer such as a workstation, a desktop computer, a laptop, a tablet, a smartphone, and so forth. Other non-limiting examples of the computing system 100 include a rack-mountable computing device or embedded computing device, such as a server, an industrial control system, and so forth. Further, in some cases the computing system 100 may have a distributed implementation comprising a plurality of computing devices that are powered using a power supply system comprising one or more power supplies 140-1, . . . , 140-K.

The computing system 100 comprises a plurality of processing units, which represent any number of processing elements that each can include any number of processing cores. Some non-limiting examples of the plurality of processing units include a microprocessor, a digital signal processor (DSP), an application-specific integrated chip (ASIC), and a field programmable gate array (FPGA), or combinations thereof. As shown, the computing system 100 comprises a CPU 105 and a plurality of GPUs 135-1, . . . , 135-N (generically referred to as a GPU 135), although other configurations are also possible.

The CPU 105 and the GPUs 135 are coupled with a plurality of power supplies 140-1, . . . , 140-K (generically referred to as a power supply 140) via a bus 150. The plurality of power supplies 140 collectively provide a (rated) power supply capacity 145 from which the CPU 105 and GPUs 135 are powered. In some embodiments, each of the GPUs may consume more power than the CPU 105, although this is not a requirement. The plurality of power supplies 140 may power additional components of the computing system 100. In some embodiments, the power supply capacity 145 is sufficient to operate the CPU 105 and the GPUs 135 in a full-power mode. The power supply capacity 145 may be reduced by a degraded or failed power supply 140.

The computing system 100 further comprises a memory 110, which may comprise volatile memory elements (such as random access memory), non-volatile memory elements (such as solid-state, magnetic, optical, or Flash-based storage), and combinations thereof. Moreover, the memory 110 may be distributed across different mediums (e.g., network storage or external hard drives).

The memory 110 may comprise one or more "modules" for performing various functions described herein. In one embodiment, each module includes program code that is executable by one or more of the processing units (e.g., the CPU 105). However, other embodiments may include modules that are partially or fully implemented in hardware (i.e., circuitry) or firmware of the computing system 100. As shown, the memory 110 comprises a workload management module 115 configured to distribute computing workloads 155 (also, workloads 155) among various computing processing units (e.g., the GPUs 135-1, . . . , 135-N). The workloads 155 may encompass any number of suitable computing tasks. In some embodiments, each workload 155 comprises one or more functions to be executed by the processing unit to which the workload 155 is distributed.

The workload management module 115 is further configured to prioritize power delivery from a plurality of power supplies 140-1, . . . , 140-K to the different processing units (e.g., the GPUs 135-1, . . . , 135-N). In some embodiments, the CPU 105 executes the workload management module 115 and communicates control signals 160 with the plurality of power supplies 140-1, . . . , 140-K and/or the GPUs 135-1, . . . , 135-N to control the power draw of the GPUs 135-1, . . . , 135-N. For example, one or more GPUs 135 may be operated in a lower power setting (or powered down entirely) when not prioritized by the workload management module 115. Reducing the power draw of non-prioritized GPUs 135 generally operates to reduce the clock speeds thereof. In this way, workloads 155 that have been distributed to the GPUs 135 will continue to execute, just more slowly than in the case that the non-prioritized GPUs 135 in a full-power setting.

In some embodiments, the control signals 160 are provided to the GPUs 135, configuring selected one(s) of the GPUs 135 to reduce their power draw, while configuring prioritized selected one(s) of the GPUs 135 are prioritized by maintaining or increasing their power draw. In other embodiments, the control signals 160 are provided to the power supplies 140, which configures the power supplies 140 to reduce power supplied to selected one(s) of the GPUs 135. In such cases, the GPUs 135 may respond to the reduced power supply by transitioning into a lower power setting.

In some embodiments, the workload management module 115 determines a first workload of the workloads 155 to prioritize the completion thereof. The workload management module 115 prioritizes power delivery to a first processing unit (e.g., a GPU 135) to which the first workload is distributed. In some embodiments, the workload management module 115 operates the first processing unit in a full-power mode until completion of the first workload, then powers down the first processing unit. In an alternate embodiment, the first processing unit is operated in a reduced-power mode after completion of the first workload. The workload management module 115 may operate some or all of the other processing units (e.g., other GPUs 135 and/or the CPU 105) of the computing system 100 in a reduced-power mode during the completion of the first workload.

Beneficially, by prioritizing power delivery to the first processing unit, the first workload may be completed earlier than in other schemes where the first processing unit has a reduced power delivery. By powering down the first processing unit responsive to completion of the first workload, a relatively larger amount of power budget may be made available for operating the other processing units. This may improve the robustness of the computing system 100 as the remaining workloads 155 may be completed more quickly while the issue causing the reduced power delivery is remedied (e.g., a failed power supply is replaced by a human operator). One or more of the other processor units may have their workloads prioritized in a similar manner. In some embodiments, after one or more of the processing units have been powered down, the other processing units receive a proportional power delivery from the power supply capacity 145.

In some embodiments, the first workload is selected to be prioritized based on an expected timing of completion. For example, the workload management module 115 may determine that the first workload is expected to complete before some or all of the other workloads 155. In some embodiments, selecting the first workload is based on historical workload information 120, which represents any information that distinguishes the timing of completion for different workloads 155. The historical workload information 120 may be stored in the memory 110 in any suitable form.

In some embodiments, the first workload is determined by the workload management module 115 based on determining that the first workload is expected to complete within a predetermined amount of time. For example, the workload management module 115 may consider prioritizing only those workloads that are expected to complete within a five hundred millisecond (500 ms) period, although other values are also possible. In some cases, the period is selected such that prioritizing a workload that is expected to complete outside of the period can be considered to provide only a marginal or insignificant benefit to the operation (e.g., power savings, enabling an earlier completion of other workloads, etc.) of the computing system 100.

The predetermined amount of time may be determined by the workload management module 115, e.g., based on the historical workload information 120. For example, the workload management module 115 may use runtime information 130 to determine an average runtime, a best-case runtime, a worst-case runtime, etc. for each of the different workloads 155 (or for particular functions included therein). The workload management module 115 may then determine the amount of time based on the runtime information 130.

In some embodiments, the historical workload information 120 comprises distribution information 125 indicating a distribution of one or more previously completed workloads 155 among the plurality of processing units. The distribution information 125 may be implemented in any suitable form, such as a total number of workloads completed by the different processing unit (e.g., a histogram), a total number of workloads completed during a particular period, an average time between workloads distributed to a particular processing unit, percentages of workloads completed, and so forth. The distribution information 125 may reflect the different types of completed workloads, or may be agnostic to the different types of completed workloads.

In some embodiments, the workload management module 115 determines the first (prioritized) workload by identifying, based on the distribution information 125, which processing unit of the plurality of processing units is least likely to have a workload distributed to it after the reduced power supply capacity is detected. The workload management module 115 selects the first workload from the identified processing unit. In some cases, the identified processing unit may represent a processing unit that may be powered down first. For example, a first processing unit may have completed 50% of the completed workloads indicated by the distribution information 125, a second processing unit may have completed 30% of the completed workloads, and a third processing unit may have completed 20% of the completed workloads. Thus, the workload management module 115 may identify the third processing unit as the least likely to have a workload distributed to it, and may prioritize the workload being completed by the third processing unit so that the third processing unit may be powered down first.

In some embodiments, the historical workload information 120 comprises runtime information 130 indicating expected runtimes for completing different types of the workloads 155. In one example, a first workload comprises a first function. The workload management module 115 may compile the runtime information 130 by storing a start time and a stop time (e.g., in the memory 110) for one or more instances of previously completing the first function. For example, the CPU 105 may distribute a workload 155 comprising an example function according to the code of Table 1:

TABLE 1

Example function code

__global__ Boolean vectorSum(Block block) {
int vectorIndex = block.x * block.size + thread.x;
result[vectorIndex] = a[vectorIndex] + b[vectorIndex];
return TRUE;
}

In Table 1, the identifier "__global__" uses special instructions in the source code to distribute the workload to a GPU. The start time is acquired by the CPU when the workload is distributed to the GPU, and the stop time is acquired by the CPU when the workload is completed by the GPU.

Alternately, the runtime information 130 may reflect the runtime of the entire workload and is not specific to a particular function. In some embodiments, the workload management module 115 determines an average runtime of the first function, based on the start time(s) and the stop time(s) stored in the memory 110, and determines an expected completion time for the function based on the average runtime. Other measures related to the runtime of workloads 155 and/or functions are also contemplated. For example, the workload management module 115 may consider a longest runtime (a worst-case scenario), a shortest runtime (a best-case scenario), a mode of the runtime (a most-likely scenario), etc. when determining the expected completion time for the workload (or a function included therein).

Figure 2:
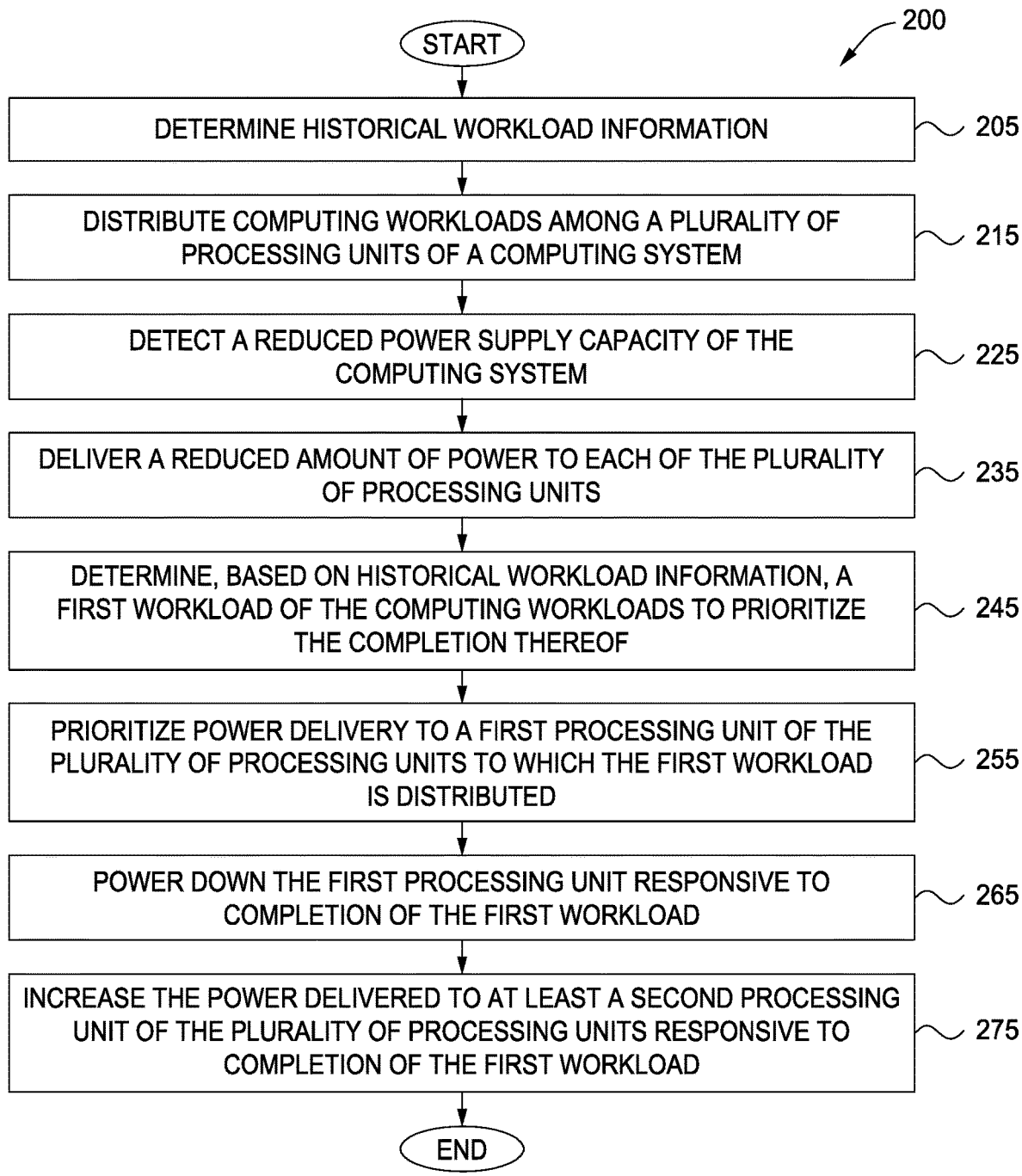
FIG. 2 is an exemplary method of distributing power among a plurality of processing units of a computing system, according to one or more embodiments.

FIG. 2 is an exemplary method 200 of distributing power among a plurality of processing units of a computing system, according to one or more embodiments. The method 200 may be used in conjunction with other embodiments, such as being performed by the workload management module 115 of FIG. 1.

The method 200 begins at block 205, where the workload management module 115 determines historical workload information. In some embodiments, the historical workload information comprises one or more of: (1) distribution information indicating a distribution of one or more previously completed workloads among the plurality of processing units, and (2) runtime information for the one or more previously completed workloads (e.g., one or more instances of previously completing functions included therein).

At block 215, the workload management module 115 distributes computing workloads among a plurality of processing units of a computing system. In some embodiments, the workload management module 115 is executed by a CPU of the computing system, and the computing workloads are distributed among a plurality of GPUs of the computing system.

At block 225, the workload management module 115 detects a reduced power supply capacity of the computing system. For example, the workload management module 115 may receive a signal indicating at least one degraded or failed power supply of the computing system.

At block 235, a reduced amount of power is delivered to each of the plurality of processing units. In some embodiments, block 235 is performed contemporaneously with block 245, where the workload management module 115 determines, based on historical workload information, a first workload of the computing workloads to prioritize the completion thereof.

At block 255, the workload management module 115 prioritizes power delivery to a first processing unit of the plurality of processing units to which the first workload is distributed. In some embodiments, the workload management module 115 communicates control signals with power supplies and/or processing units of the computing system to control the power draw of the processing units. For example, the control signals may place the first processing unit in a full-power mode while one or more other processing units operate in a reduced-power mode. At block 265, the first processing unit is powered down responsive to completion of the first workload.

At block 275, the workload management module increases the power delivered to at least a second processing unit of the plurality of processing units responsive to completion of the first workload. In some embodiments, increasing the power delivered to at least the second processing unit comprises providing a proportional power delivery to the remaining processing units (i.e., excluding the powered-down first processing unit). The method 200 ends following completion of block 275.

Figure 3:
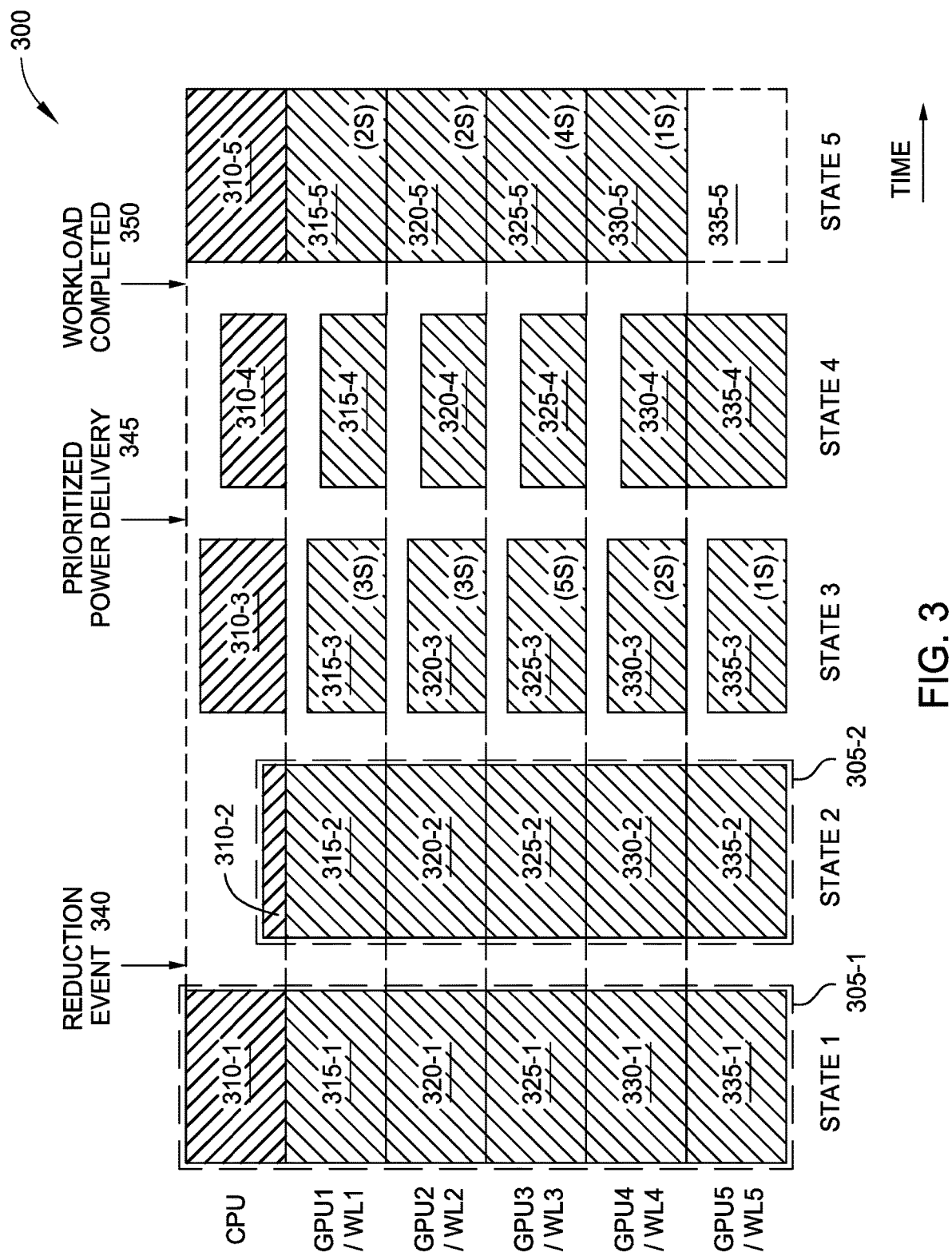
FIG. 3 is an exemplary sequence of distributing power responsive to a reduced power supply capacity, according to one or more embodiments.

FIG. 3 is an exemplary sequence 300 of distributing power responsive to a reduced power supply capacity, according to one or more embodiments. The sequence 300 represents one example of the method 200 of FIG. 2, and may be used in conjunction with other embodiments.

In the sequence 300, one (1) CPU distributes workloads among five (5) GPUs, although other numbers are also possible. As shown, the CPU has distributed a workload WL1 to GPU1, a workload WL2 to GPU2, a workload WL3 to GPU3, a workload WL4 to GPU4, and a workload WL5 to GPU5.

In State 1, the power supply capacity 305-1 of the computing system is, at a minimum, adequate for powering all of the one CPU and five GPUs in their full-power modes. The power supply capacity in State 1 may represent a rated power supply capacity (e.g., each of the power supplies providing its rated power level), but this is not a requirement.

In State 1, a power amount 310-1 is delivered to the CPU in State 1, a power amount 315-1 is delivered to the GPU1, a power amount 320-1 is delivered to the GPU2, a power amount 325-1 is delivered to the GPU3, a power amount 330-1 is delivered to the GPU4, and a power amount 335-1 is delivered to the GPU5. Although the power amounts 310-1, 315-1, 320-1, 325-1, 330-1, 335-1 are shown as approximately a same size (suggesting a same power consumption by the CPU and GPUs), varying amounts of power consumption among the CPU and the GPUs are possible.

A reduction event 340 transitions the computing system from State 1 into State 2, in which the computing system has a reduced power supply capacity 305-2. For purposes of the example, assume that the reduced power supply capacity 305-2 also applies to the subsequent State 3, State 4, and State 5. The reduction event 340 represents any reduction in power supply capacity, such as a degradation or failure of a power supply. The reduced power supply capacity 305-2 is inadequate for powering all of the one CPU and five GPUs in their full-power modes.

In State 2, power amounts 315-2, 320-2, . . . , 335-2 delivered to GPU1, GPU2, GPU5 remain the same as the power amounts 315-1, 320-1, . . . , 335-1 of State 1. The power amount 310-2 delivered to the CPU is reduced from the power amount 310-1 of State 1. Thus, the CPU may initially transition into a reduced power mode responsive to the reduction event 340, while the GPUs initially remain in their full-power modes.

In State 3, the power amounts 315-3, 320-3, . . . , 335-3 delivered to GPU1, GPU2, GPU5 are decreased from the power amounts 315-2, 320-2, . . . , 335-2 of State 2. The power amount 310-3 delivered to the CPU is increased from the power amount 310-2 of State 2. As shown, in State 3 the power reduction from the power supply capacity 305-1 to the reduced power supply capacity 305-2 is approximately proportionally distributed among the CPU and GPUs. Other implementations may distribute the power reduction differently.

In some embodiments, the CPU is configured to determine a first workload of workloads WL1, WL5 to prioritize in State 3 (i.e., while a reduced amount of power is delivered to each of the GPUs). As shown, in State 3 the CPU determines that the workload WL1 is expected to complete in three (3) seconds, the workload WL2 is expected to complete in three (3) seconds, the workload WL3 is expected to complete in five (5) seconds, the workload WL4 is expected to complete in two (2) seconds, and the workload WL5 is expected to completed in one (1) second. As the workload WL5 is expected to complete first of the workloads WL1, WL5, the CPU prioritizes workload WL5.

The computing system transitions from State 3 to State 4 responsive to the prioritized power delivery 345. In State 4, the power amount 335-4 is increased from the power amount 335-3 to prioritize power delivery to the GPU5. The power amounts 310-4, 315-4, . . . , 330-4 delivered to the CPU, GPU1, GPU4 are decreased from the power amounts 310-3, 315-3, . . . , 330-3 of State 3. The power reduction to the CPU, GPU1, GPU4 from the power amounts 310-3, 315-3, . . . , 330-3 is approximately proportional, although other distributions are also possible. For example, the power amount 310-4 delivered to the CPU may be maintained at the power amount 310-3 of State 3.

Responsive to completion of the workload WL5 ("workload completed 350"), the computing system transitions from State 4 to State 5. The GPU5 has been powered down (illustrated as a zero power amount 335-5), freeing a portion of the power budget to be made available for operating the CPU, GPU1, GPU4. In State 5, the power amounts 310-5, 315-5, . . . , 330-5 delivered to the CPU, GPU1, GPU4 are increased from the power amounts 310-4, 315-4, . . . , 330-4 of State 4. As shown, the power amounts 310-5, 315-5, . . . , 330-5 are adequate for powering the CPU and GPU1, GPU4 in their full-power modes.

Now referring also to FIG. 4, which illustrates exemplary historical workload information comprising average runtimes, a chart 400 includes runtime information for a plurality of functions f1, f2, . . . , fk. The chart 400 comprises a function field 410, an instance field 415, a start time field 420, a stop time field 425, a runtime field 430, and an average runtime field 435. The function f1 has an average runtime of 4.5 seconds based on three instances, the function f2 has an average runtime of 3.3 seconds based on one instance, the function f3 has an average runtime of 4.8 seconds based on one instance, and the function fk has an average runtime of 6.1 seconds based on two instances.

A chart 405 includes expected completion time for a plurality of workloads. The charts 400, 405 represent one example of information used to prioritize power delivery (e.g., beginning with State 3 of the sequence 300 of FIG. 3). The chart 405 comprises a workload field 440, a function field 445, a GPU field 450, a start time field 455, an average runtime field 460, an expected completion time 465, and an expected time remaining field 470. The chart 405 further comprises a current time value 475 and a predetermined completion window value 480.

The workload WL1 comprises the function f1 and is distributed to the GPU1. The expected time remaining is 3.2 seconds at the current time value 475. The workload WL2 comprises the function f1 and is distributed to the GPU2. The expected time remaining is 2.6 seconds. The workload WL3 comprises the function fk and is distributed to the GPU3. The expected time remaining is 5.4 seconds. The workload WL4 comprises the function f3 and is distributed to the GPU4. The expected time remaining is 1.9 seconds. The workload WL5 comprises the function f2 and is distributed to the GPU5. The expected time remaining is 1.4 seconds. The values of the expected time remaining field 470 for the workloads WL1, WL5 may then be used by the CPU at State 3 to determine to prioritize the workload WL5.

Figure 5:
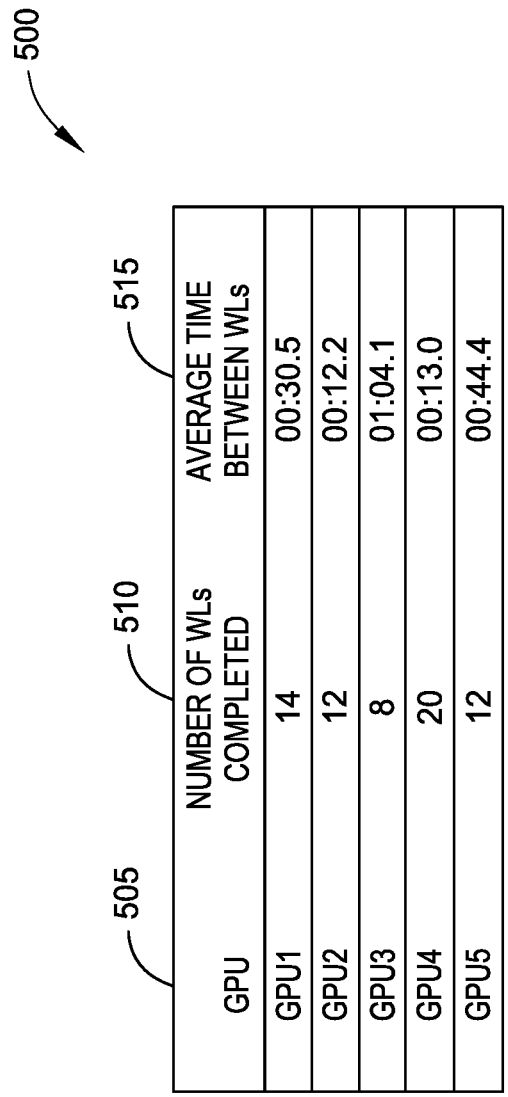
FIG. 5 illustrates exemplary historical workload information comprising distribution information, according to one or more embodiments.

FIG. 5 illustrates exemplary historical workload information comprising distribution information, according to one or more embodiments. The features described with respect to FIG. 5 may be used in conjunction with other embodiments, such as the workload management module 115 of FIG. 1.

A chart 500 comprises a GPU field 505, a number of workloads (WLs) completed field 510, and an average time between WLs field 515. GPU1 has completed 14 workloads with an average time of 30.5 seconds between workloads. GPU2 has completed 12 workloads with an average time of 12.2 seconds between workloads. GPU3 has completed 8 workloads with an average time of 1 minute, 4.1 seconds between workloads. GPU4 has completed 20 workloads with an average time of 13.0 seconds between workloads. GPU5 has completed 12 workloads with an average time of 44.4 seconds between workloads.

As described above, the CPU of the computing system prioritizes the workloads based on which GPU is least likely to have a workload distributed to it after the reduced power supply capacity is detected. In some embodiments, the CPU prioritizes a workload distributed to GPU3 based on the number of WLs completed by GPU3 (i.e., 8) being less than all other GPUs. In other embodiments, the CPU prioritizes a workload distributed to GPU3 based on the average time between WLs (i.e., 1:04.1) being greater than all other GPUs. In other embodiments, the CPU may consider both the number of WLs and the average time between WLs. For example, the GPU2 and the GPU5 have each completed 12 WLs. However, because the GPU2 has a smaller average time between WLs (12.2 seconds) than GPU5 (44.4 seconds), the CPU prioritizes a workload distributed to GPU5 over one distributed to GPU2. Instead of considering the average time between WLs as a tie-breaker, the CPU may alternately perform a random selection between the tied GPUs, may perform weighted combinations of the number of WLs completed and the average time between WLs, and so forth.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
   distributing computing workloads among a plurality of processing units of a computing system;
   responsive to detecting a reduced power supply capacity of the computing system:
   determining, based on historical workload information reflecting one or more previously completed workloads, a first workload of the computing workloads to prioritize the completion thereof; and
   prioritizing power delivery to a first processing unit of the plurality of processing units to which the first workload is distributed; and
   powering down the first processing unit responsive to completion of the first workload.

2. The method of claim 1, further comprising:
   responsive to detecting the reduced power supply capacity:
   delivering a reduced amount of power to each of the plurality of processing units while determining the first workload,
   wherein prioritizing power delivery to the first processing unit comprises increasing the power delivered from the reduced amount.

3. The method of claim 1, wherein determining the first workload comprises:
determining that the first workload is expected to complete within a predetermined amount of time.

4. The method of claim 3, wherein the first workload comprises a first function, the method further comprising:
determining the historical workload information, wherein determining the historical workload information comprises:
storing a start time and a stop time for one or more instances of previously completing the first function reflected in the one or more previously completed workloads; and
determining, based on the start time and the stop time, an average runtime of the first function,
wherein determining that the first workload is expected to complete within a predetermined amount of time is based on the average runtime.

5. The method of claim 1, further comprising:
determining the historical workload information, wherein determining the historical workload information comprises:
storing distribution information indicating a distribution of the one or more previously completed workloads among the plurality of processing units,
wherein determining the first workload comprises:
identifying, based on the distribution information, which processing unit of the plurality of processing units is least likely to have a workload distributed to it after the reduced power supply capacity is detected, and
selecting the first workload from the identified processing unit.

6. The method of claim 1, further comprising:
increasing the power delivered to at least a second processing unit of the plurality of processing units responsive to completion of the first workload.

7. The method of claim 1, wherein the computing system comprises a plurality of power supplies, and
wherein detecting a reduced power supply capacity of the computing system comprises detecting a failure of at least one power supply of the plurality of power supplies.

8. A computing system comprising:
a plurality of power supplies; and
a plurality of processing units, wherein a first set comprising a first processing unit of the plurality of processing units is configured to:
distribute computing workloads among a second set of the plurality of processing units;
responsive to detecting a reduced power supply capacity of the plurality of power supplies:
determine, based on historical workload information reflecting one or more previously completed workloads, a first workload of the computing workloads to prioritize the completion thereof; and
prioritize power delivery to a selected processing unit of the second set to which the first workload is distributed; and
power down the selected processing unit responsive to completion of the first workload.

9. The computing system of claim 8, wherein the first processing unit comprises a central processing unit, and wherein the second set comprises a plurality of graphics processing units.

10. The computing system of claim 8, wherein the first set is further configured to:
responsive to detecting the reduced power supply capacity:
deliver a reduced amount of power to each processing unit of the second set while determining the first workload,
wherein prioritizing power delivery to the selected processing unit of the second set comprises increasing the power delivered from the reduced amount.

11. The computing system of claim 8, wherein determining the first workload comprises:
determining that the first workload is expected to complete within a predetermined amount of time.

12. The computing system of claim 11, wherein the first workload comprises a first function, wherein the first set is further configured to:
determine the historical workload information, wherein determining the historical workload information comprises:
storing a start time and a stop time for one or more instances of previously completing the first function reflected in the one or more previously completed workloads; and
determining, based on the start time and the stop time, an average runtime of the first function,
wherein determining that the first workload is expected to complete within a predetermined amount of time is based on the average runtime.

13. The computing system of claim 8, wherein the first set is further configured to:
determine the historical workload information, wherein determining the historical workload information comprises:
storing distribution information indicating a distribution of the one or more previously completed workloads among the second set,
wherein determining the first workload comprises:
identifying, based on the distribution information, which processing unit of the plurality of processing units is least likely to have a workload distributed to it after the reduced power supply capacity is detected, and
selecting the first workload from the identified processing unit.

14. The computing system of claim 8, wherein detecting a reduced power supply capacity comprises detecting a failure of at least one power supply of the plurality of power supplies.

15. A computer program product for distributing power among a plurality of graphics processing units (GPUs) of a computing system, the computer program product comprising:
a computer-readable storage medium having computer-readable program code embodied therewith, the computer-readable program code executable by one or more computer processors to perform an operation comprising:
distributing computing workloads among the plurality of GPUs;
responsive to detecting a reduced power supply capacity of the computing system:
determining, based on historical workload information reflecting one or more previously completed workloads, a first workload of the computing workloads to prioritize the completion thereof; and prioritizing power delivery to a first GPU of the plurality of GPUs to which the first workload is distributed; and powering down the first GPU responsive to completion of the first workload.

16. The computer program product of claim 15, the operation further comprising:

responsive to detecting the reduced power supply capacity:

delivering a reduced amount of power to each of the plurality of GPUs while determining the first workload, wherein prioritizing power delivery to the first GPU comprises increasing the power delivered from the reduced amount.

17. The computer program product of claim 15, wherein determining the first workload comprises:

determining that the first workload is expected to complete within a predetermined amount of time.

18. The computer program product of claim 17, wherein the first workload comprises a first function, the operation further comprising:

determining the historical workload information, wherein determining the historical workload information comprises:

storing a start time and a stop time for one or more instances of previously completing the first function reflected in the one or more previously completed workloads; and determining, based on the start time and the stop time, an average runtime of the first function, wherein determining that the first workload is expected to complete within a predetermined amount of time is based on the average runtime.

19. The computer program product of claim 15, the operation further comprising:

determining the historical workload information, wherein determining the historical workload information comprises:

storing distribution information indicating a distribution of the one or more previously completed workloads among the plurality of GPUs, wherein determining the first workload comprises:

identifying, based on the distribution information, which GPU of the plurality of processing units is least likely to have a workload distributed to it after the reduced power supply capacity is detected, and selecting the first workload from the identified GPU.

20. The computer program product of claim 15, wherein the computing system comprises a plurality of power supplies, and wherein detecting a reduced power supply capacity of the computing system comprises detecting a failure of at least one power supply of the plurality of power supplies.

* * * * *